Aug. 14, 1951  C. W. HUMMER  2,564,600
AUTOMOBILE DOOR SAFETY LOCK
Filed Aug. 3, 1949
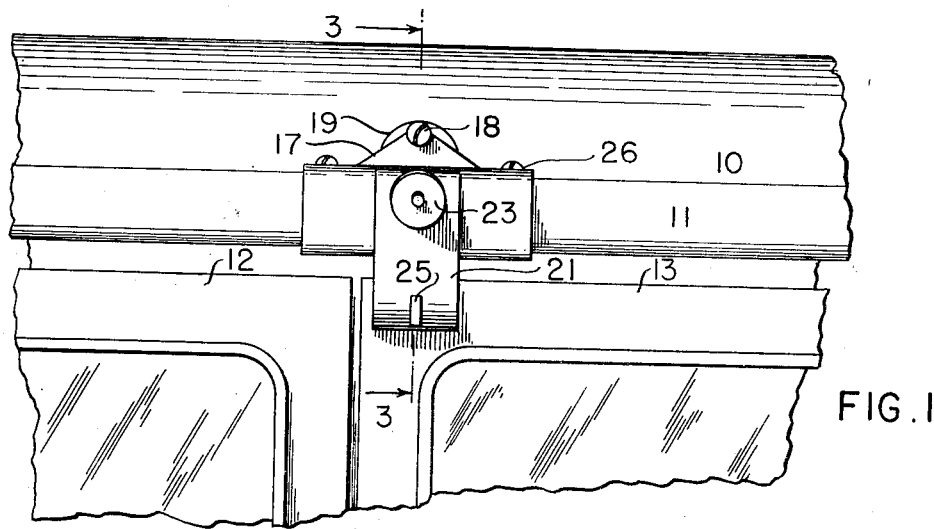
FIG.1
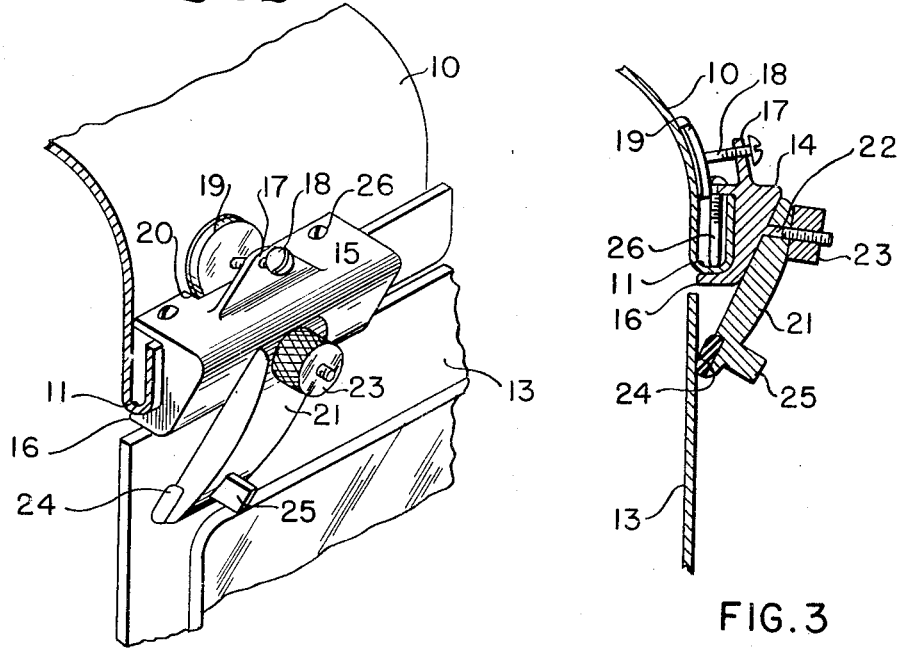
FIG.2
FIG.3
INVENTOR.
CHARLES W. HUMMER
BY
Townsend+Decker
ATTORNEYS Patented Aug. 14, 1951

2,564,600

UNITED STATES PATENT OFFICE 2,564,600

AUTOMOBILE DOOR SAFETY LOCK

Charles W. Hummer, Woodhaven, N. Y.

Application August 3, 1949, Serial No. 108,271

6 Claims. (Cl. 292—206)

This invention relates to automobiles of the "closed" type having a roof and side doors adapted to swing outwardly and provided with conventional handles or latching means for holding the doors in closed position and operable from either side of the doors.

The principal object of the invention is the production of a simple, inexpensive and quickly detachable device adapted to be attached to and supported by the roof of the automobile and so constructed as to prevent the unauthorized opening of a door of an automobile from the inside of the car.

In its specific embodiment the invention takes advantage of the presence of the conventional rain or water channel at the free edge of the overhanging sides of the roof of an automobile and extending longitudinally thereof and utilizes said channel as a convenient anchoring means for detachably securing the device of the invention thereto.

The invention is particularly useful, as an example, in cases where a small child is riding on the rear seat of an automobile and who may be tempted to turn the conventional handle of a door to open it while the car is in motion with the possibility presented of the child falling out of the car and resulting in its serious injury.

In the accompanying drawing illustrating a practical embodiment of the invention:

Fig. 1 is a front elevation of a fragmentary portion of a side of a closed automobile showing the invention applied thereto.

Fig. 2 is a perspective view of the device of the invention, and

Fig. 3 is a vertical cross-section on the line 3—3 of Fig. 1.

Referring in detail to the several figures of the drawing:

The reference numeral 10 indicates one of the overhanging side portions of the roof of an automobile which is integral with said roof and the lower free edge of which is bent or turned upwardly to form a water or rain channel or trough 11 extending longitudinally of said roof whereby rain or water dripping from the roof will enter the channel and flow to either end thereof for drainage therefrom. 12 and 13 indicate the conventional side doors for the automobile the opening edges of which lie adjacent each other. Said doors, as customarily, are provided with conventional latches (not shown) for holding the doors in closed position and provided with actuating handles on either side of said doors for retracting the latches to permit the doors to be opened outwardly.

The body of the automobile door safety lock of the invention is indicated at 14. It is provided with horizontal upper and lower flanges 15 and 16 respectively and its outer or front face is inclined inwardly towards the automobile as shown in Figs. 2 and 3. Said body is also provided with an upwardly extending support or ear 17 through which a headed screw-threaded bolt 18 is threaded. Said bolt carries a disk or other suitable member on its inner end indicated at 19 which is constructed of a compressible material as rubber or felt so as not to mar or scratch the surface of the roof of the automobile. Said disk 19 normally extends partially within a slot 20 with which the upper flange 15 is provided.

A pivoted locking member or arm is indicated at 21. It is pivotally mounted on an outwardly extending stud or pivot 22 attached to and preferably integral with the body 14 and the outer end of said stud is screw-threaded for reception of a knurled thumb-nut 23 for engagement with the locking arm 21 for frictionally holding it in the desired position. Said locking arm 21 extends or is inclined inwardly from the body 14 and in the direction of the doors 12 and 13 and its lower end, on the inner side thereof, is grooved transversely thereof and receives a strip of compressible material 24 secured within the groove and adapted to engage the upper frame of one of said doors. The lower end of the locking arm 21 is also provided with a thumb piece 25 for manually swinging the locking arm on its pivot when so desired.

When the device is detachably fastened to the channel 11, the body 14 snugly engages the outer wall of said channel, the upper flange 15 extends over the channel and the lower flange 16 engages beneath said channel. Screws 26 are provided which are threaded through the upper flange 15 and the lower ends of which, when the screws are tightened, lockingly engage the base of the channel, as clearly shown in Fig. 3, to securely hold or lock the device to the channel.

Assuming the door 13 is to be locked against unauthorized opening from the inside thereof, the device is mounted on and clamped to the channel 11 in the approximate position shown in Fig. 1 with the locking arm 21 lying adjacent the opening edge of said door but extending downwardly over the upper horizontal edge of the door and transversely thereto, the compressible strip 24 engages the upper frame of said door. The nut 23 is then tightened to prevent swinging of the arm on its pivot and the bolt 18 is also tightened whereby the compressible disk 19 will bear against and tightly engage the overhanging side portion 10 of the roof. The pressure of the disk 19 against the roof acts to resist and counterbalance any pressure exerted by the door against the arm 21, as is manifest, and the inwardly inclined position of said arm 21 also acts to enable said arm to resist pressure applied thereagainst by said door. To permit opening of the door in the normal manner the thumb nut 23 is first loosened and the locking arm is swung upwardly on its pivot to a horizontal position so that its end will clear the frame of the door and it is held in that position by again tightening the thumb nut 23. Complete removal of the locking device may be effected irrespective of the position of the locking arm by removing the screws 26 and no manipulation of the bolt 18 is necessary for accomplishing that purpose.

The invention claimed is:

1. An automobile door safety lock for use on an automobile of the closed type provided with outwardly swinging doors and having a roof with a water channel on a free edge thereof, comprising a body member engaging a side and the bottom of said channel, a flange on said body member extending over said channel, means extending through said flange and tightly engaging said channel for holding said body member to said channel and a pivoted locking arm carried by said body member and adapted to be swung over a horizontal edge of one of said doors and into engagement therewith to prevent the opening thereof.

2. An automobile door safety lock for use on an automobile of the closed type provided with outwardly swinging doors and a roof, comprising a body member, means for fastening said body member to a free edge of said roof, a locking arm inclined inwardly in the direction of one of said doors and slidably engaging and pivoted to said body member and adapted to be swung downwardly to substantially a vertically extending position to engage one of said doors and prevent the opening thereof and means carried by said body member and positioned above said fastening means and exerting pressure against said roof and acting to resist pressure applied against said locking arm by said door.

3. An automobile door safety lock for use on an automobile of the closed type provided with outwardly swinging doors and a roof having an overhanging portion with a U-shaped water channel on a free edge thereof, comprising a body member, an inwardly inclined wall integral with said body member, means for detachably fastening said body member to said water channel, a locking arm pivoted to and engaging the inclined wall of said body member and adapted to be swung to a vertically extending position to engage one of said doors and prevent the opening thereof, means for holding said arm in horizontal and inoperative position and means extending through said body member and exerting pressure against the overhanging portion of said roof and acting to resist pressure applied against said locking arm by said door, said last-named means being positioned above the aforesaid means for fastening said body member to said water channel.

4. An automobile door safety lock for use on an automobile of the closed type provided with outwardly swinging doors and a roof having a water channel integral with a free edge of the roof, comprising a body member, upper and lower flanges on said body member, said upper flange extending over said channel and said lower flange engaging beneath said channel, means extending through said upper flange and engaging the bottom of said channel for fastening said body member to said channel and a locking arm pivoted to said body member and adapted to be swung to a position to engage one of said doors to prevent the opening thereof.

5. An automobile door safety lock for use on an automobile of the closed type provided with outwardly swinging doors and a roof having a U-shaped water channel at its free edge, comprising a body member, means for detachably fastening said body member to said U-shaped water channel, a locking arm pivoted to said body member and adapted to be swung to a position to engage one of said doors to prevent the opening thereof, an upwardly extending support on said body member and a bolt threaded through said support and provided with a compressible member exerting pressure against said roof and acting to resist pressure exerted by said door against said locking arm.

6. An automobile door safety lock for use on an automobile of the closed type provided with outwardly swinging doors and a roof having a water channel at its free edge, comprising a body member interfitting with and extending over and beneath said water channel, means extending through said body member and tightly engaging said channel for detachably fastening said body member to said channel, a locking arm pivoted to said body member and adapted to be swung to a position to engage one of said doors to prevent the opening thereof and means carried by said body member and exerting pressure against said roof and acting to resist pressure applied against said locking arm by said door, said last-named means being positioned above the aforesaid means for detachably fastening said body member to said water channel.

CHARLES W. HUMMER.

REFERENCES CITED

The following references are of record in the file of this patent:

UNITED STATES PATENTS

| Number | Name | Date |
|---|---|---|
| 910,283 | Gerst | Jan. 19, 1909 |